(12) United States Patent
Imazuka et al.

(10) Patent No.: US 10,926,297 B2
(45) Date of Patent: Feb. 23, 2021

(54) MERCHANDISE SORTING DEVICE AND SORTING PLATE

(71) Applicants: KABUSHIKI KAISHA TOSHIBA, Tokyo (JP); Toshiba Infrastructure Systems & Solutions Corporation, Kanagawa (JP)

(72) Inventors: Katsuo Imazuka, Yokohama Kanagawa (JP); Tooru Watanabe, Matsudo Chiba (JP); Tetsuo Watanabe, Machida Tokyo (JP); Kyouichi Tobayama, Kawasaki Kanagawa (JP)

(73) Assignees: KABUSHIKI KAISHA TOSHIBA, Tokyo (JP); TOSHIBA INFRASTRUCTURE SYSTEMS & SOLUTIONS CORP., Kanagawa (JP)

( * ) Notice: Subject to any disclaimer, the term of this patent is extended or adjusted under 35 U.S.C. 154(b) by 39 days.

(21) Appl. No.: 16/110,430

(22) Filed: Aug. 23, 2018

(65) Prior Publication Data
US 2019/0060959 A1 Feb. 28, 2019

(30) Foreign Application Priority Data
Aug. 30, 2017 (JP) .............................. JP2017-165961

(51) Int. Cl.
*B07C 1/14* (2006.01)
*B65G 47/88* (2006.01)
(Continued)

(52) U.S. Cl.
CPC .................. *B07C 3/08* (2013.01); *B07C 1/14* (2013.01); *B07C 5/16* (2013.01); *B07C 5/36* (2013.01);
(Continued)

(58) Field of Classification Search
CPC .... B07C 5/16; B07C 5/36; B07C 3/08; B07C 1/14; B65G 47/96; B65G 47/8823
(Continued)

(56) References Cited

U.S. PATENT DOCUMENTS 2,596,228 A  *  5/1952  Pritchard ........... B65G 47/1492
                                                  198/383
2,686,591 A  *  8/1954  Carl .................... B07B 13/065
                                                  209/632

(Continued)

FOREIGN PATENT DOCUMENTS

EP          1010647 A1      6/2000
JP         H10-134244 A     5/1998
(Continued)

OTHER PUBLICATIONS

Russian Office Action dated Mar. 27, 2019, mailed in counterpart Russian Application No. 2018131003, 12 pages (with translation).
(Continued)

*Primary Examiner* — Terrell H Matthews
(74) *Attorney, Agent, or Firm* — Kim & Stewart LLP

(57) ABSTRACT

A merchandise sorting device includes a conveyance path, a chute, and a sorting plate. The conveyance path includes a placement surface on which an item is placed, and along which the item moves. The chute is inclined downward from the conveyance path and forms an inclined surface on which the item can be slid. The sorting plate is provided at a lower end of the chute and is rotatable about an axis paralleling an edge of the lower end of the chute to open and close the lower end of the chute.

20 Claims, 7 Drawing Sheets

(51) Int. Cl.
*B65G 47/96* (2006.01)
*B07C 3/08* (2006.01)
*B07C 5/16* (2006.01)
*B07C 5/36* (2006.01)

(52) U.S. Cl.
CPC ......... *B65G 47/8823* (2013.01); *B65G 47/96* (2013.01)

(58) Field of Classification Search
USPC .......................................................... 209/682
See application file for complete search history.

(56) References Cited

U.S. PATENT DOCUMENTS

| | | | |
|---|---|---|---|
| 3,033,366 A * | 5/1962 | Atanasoff | B07C 3/08 209/562 |
| 3,750,879 A * | 8/1973 | Luckett | B65G 1/045 198/349.8 |
| 3,900,036 A * | 8/1975 | Anderson | A01F 11/06 460/29 |
| 4,597,487 A * | 7/1986 | Crosby | G07F 7/0609 194/209 |
| 5,106,487 A * | 4/1992 | Nemedi | C22B 1/005 209/44.2 |
| 5,575,375 A | 11/1996 | Sandusky et al. | |
| 5,672,039 A | 9/1997 | Perry et al. | |
| 6,070,709 A | 6/2000 | Morchen | |
| 6,082,522 A | 7/2000 | Polling | |
| 6,357,985 B1 | 3/2002 | Anzani et al. | |
| 2004/0045744 A1 | 3/2004 | Paniagua Olaechea | |
| 2006/0278501 A1 | 12/2006 | Sweazy | |
| 2016/0280472 A1 | 9/2016 | Porat et al. | |

FOREIGN PATENT DOCUMENTS

| | | |
|---|---|---|
| JP | 2013-220362 A | 10/2013 |
| JP | 2016-026866 A | 2/2016 |
| WO | 9523750 A1 | 9/1995 |
| WO | 9806645 A1 | 2/1998 |
| WO | 2006029212 A2 | 3/2006 |

OTHER PUBLICATIONS

Extended European Search Report dated Jul. 29, 2019, mailed in counterpart European Application No. 18187452.0, 10 pages.

* cited by examiner

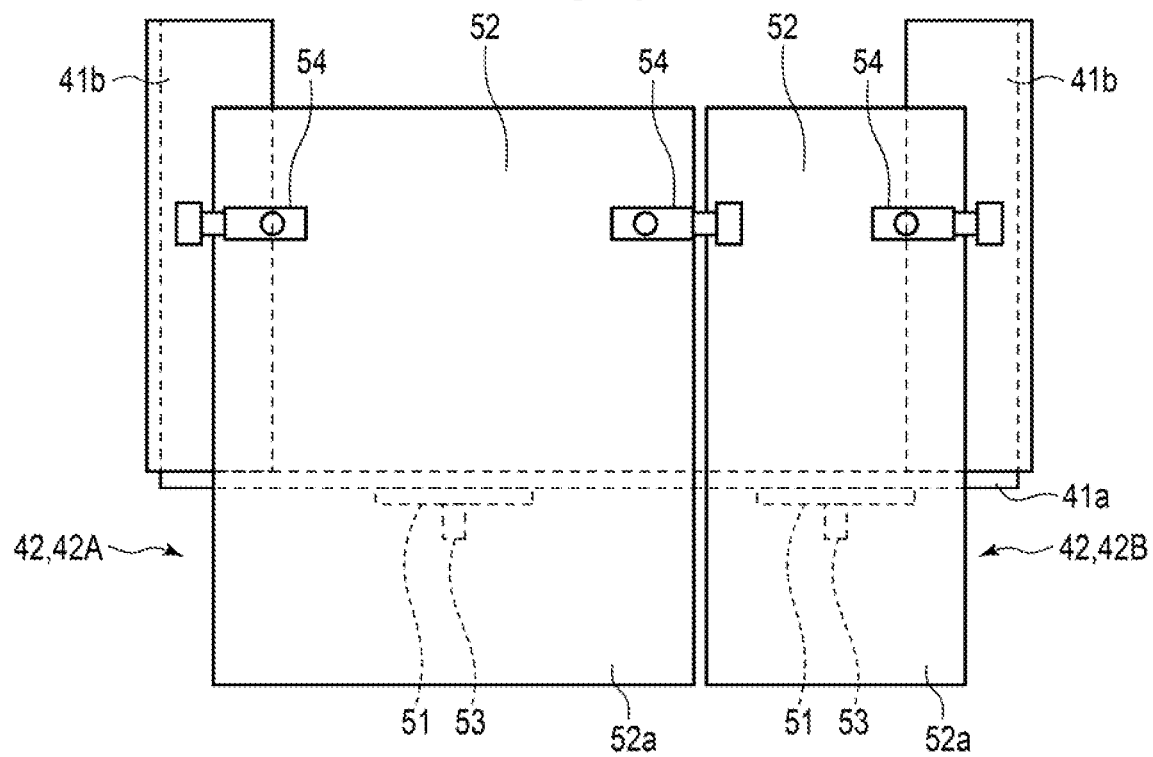
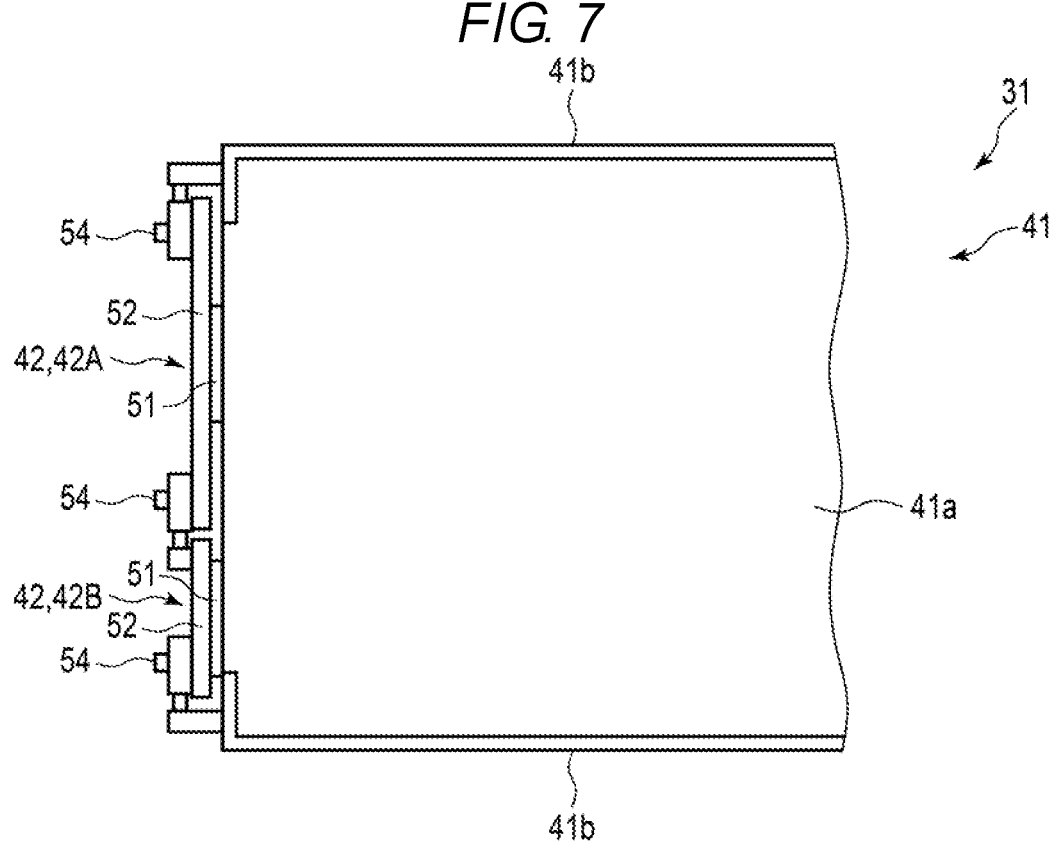

MERCHANDISE SORTING DEVICE AND SORTING PLATE

CROSS-REFERENCE TO RELATED APPLICATION

This application is based upon and claims the benefit of priority from Japanese Patent Application No. 2017-165961, filed Aug. 30, 2017, the entire contents of which are incorporated herein by reference.

FIELD

Embodiments described herein relate generally to a merchandise sorting device and a sorting plate.

BACKGROUND

A publicly known merchandise sorting device automatically sorts items of merchandise according to destination during a merchandise conveyance process. The merchandise sorting device reads sorting codes provided on each item, and sorts the items based on the read sorting codes while the items are moving along a conveyance path to different sorting chutes which are established according to item destination. Each of the sorting chutes is provided with a sorting plate at a lower end thereof in order to accumulate items. Thus the sorted items can be accumulated in each sorting chute. Then, an operator allows the accumulated items in the sorting chute to be placed into a container for shipment.

Additionally, there is another known merchandise sorting device in which a shipment container is disposed at the lower end of each sorting chute, and items from the sorting chute are directly dropped into the container without being accumulated in the sorting chute. This reduces the amount of work required of an operator. Furthermore, since the sorting chute of the merchandise sorting device includes no sorting plate for accumulation prior to placement in the shipping container, items will be accumulated in the container in sequence.

DESCRIPTION OF THE DRAWINGS

FIG. 6 is a front view illustrating a partial cross-section of the configuration of the sorting chute according to an embodiment.

FIG. 7 is a plan view illustrating a partial cross-section of the configuration of the sorting chute according to an embodiment.

DETAILED DESCRIPTION

Embodiments provide a merchandise sorting device and a sorting plate which can improve working efficiency.

In general, according to an embodiment, a merchandise sorting device comprises a conveyance path, a chute, and a sorting plate. The conveyance path includes a placement surface on which an item of merchandise or the like can be placed, and is configured to move the item. The chute is inclined downward from the conveyance path and includes a bottom wall forms an inclined surface on which the item can be slid. The sorting plate is at a lower end of the chute and rotatable about an axis along an edge of a lower end of the bottom wall to open and close the lower end of the chute.

Figure 1:
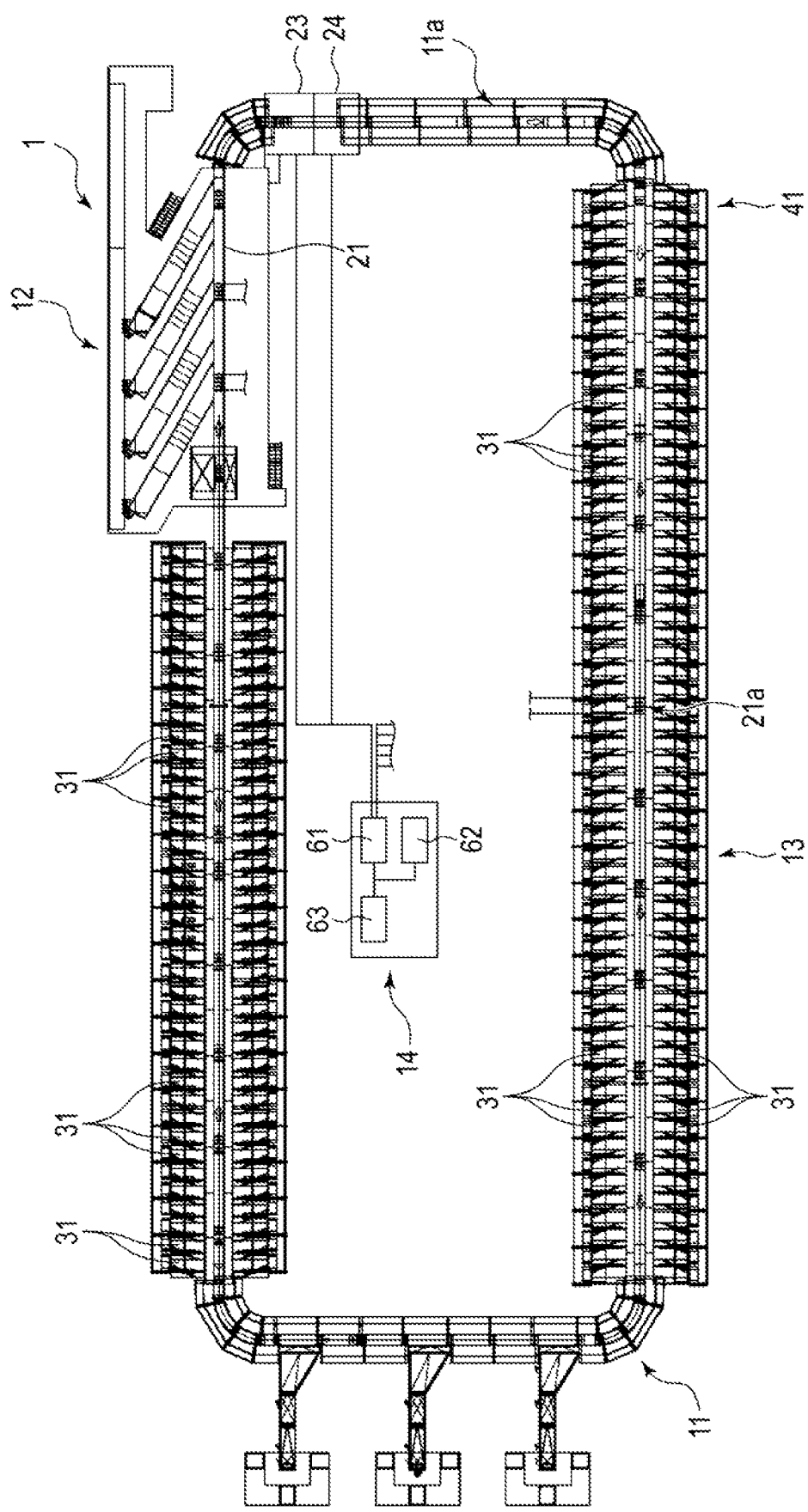
FIG. 1 is a plan view illustrating a configuration of a merchandise sorting device according to an embodiment.
Figure 2:
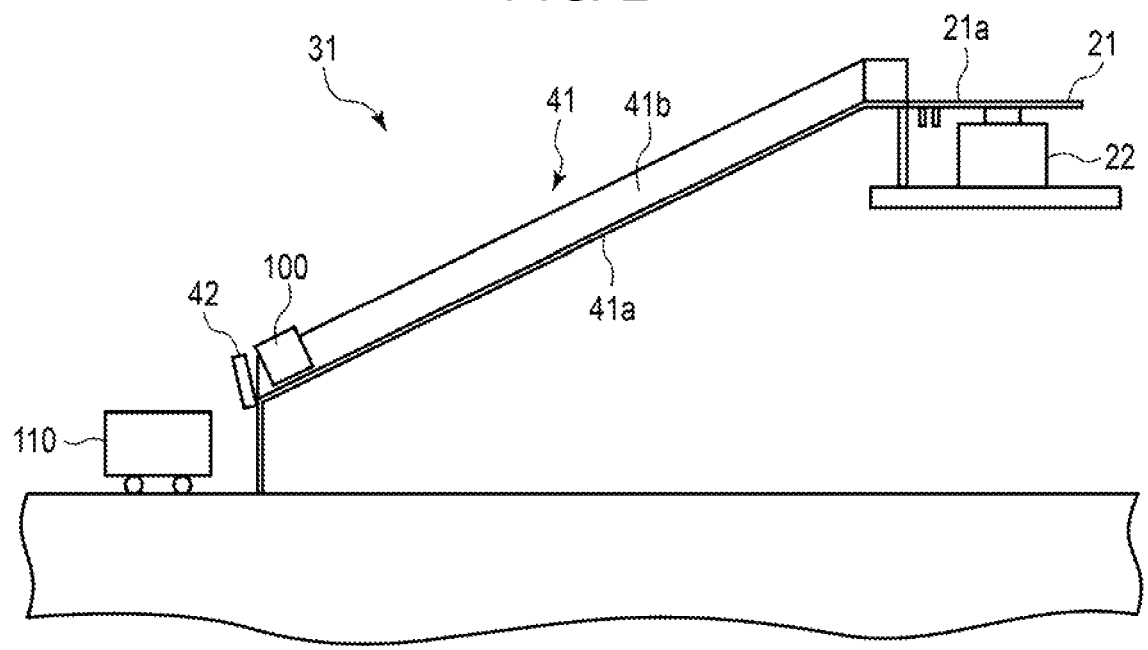
FIG. 2 is a side view schematically illustrating a configuration of a sorting chute used in the merchandise sorting device according to an embodiment.
Figure 3:
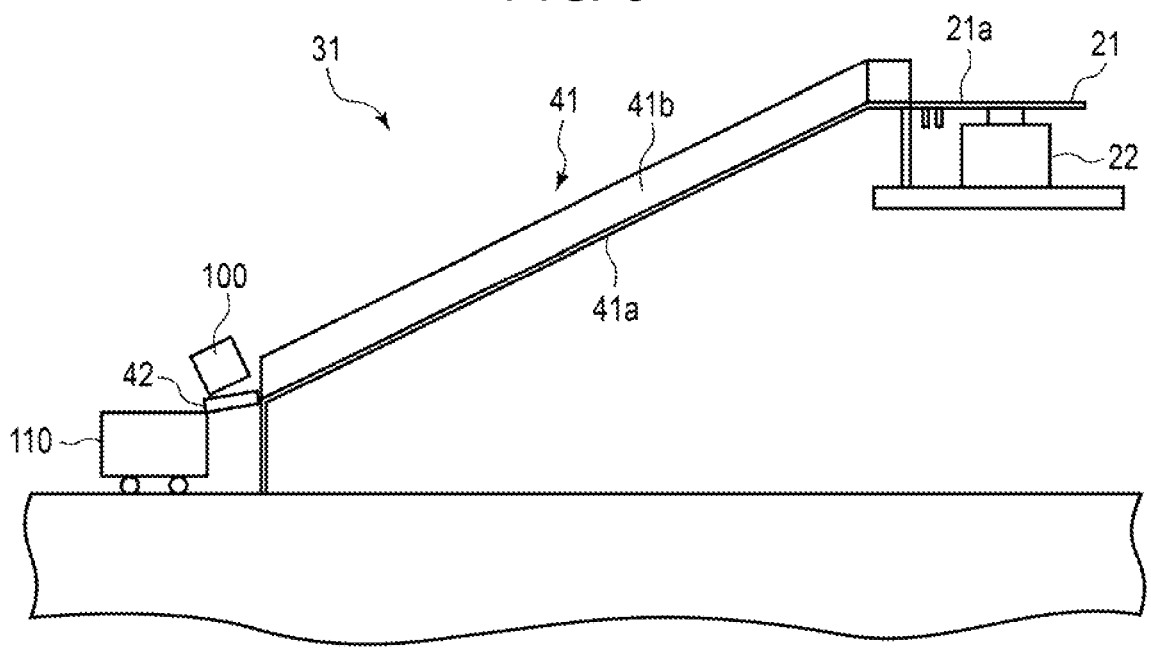
FIG. 3 is a side view schematically illustrating the configuration of the sorting chute according to an embodiment.
Figure 8:
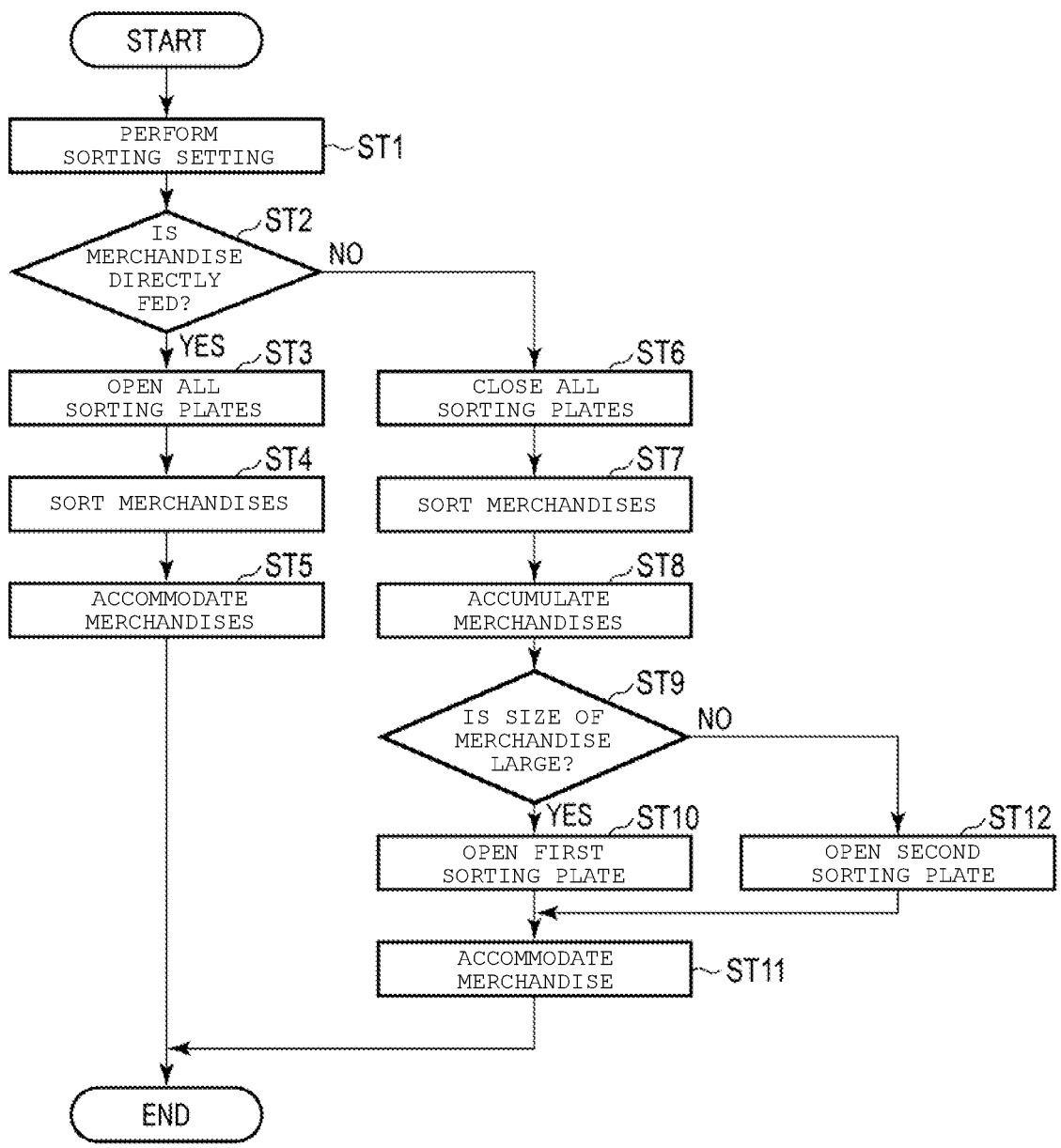
FIG. 8 is a flowchart illustrating an example of merchandise sorting work using the merchandise sorting device according to an embodiment.
Figure 9:
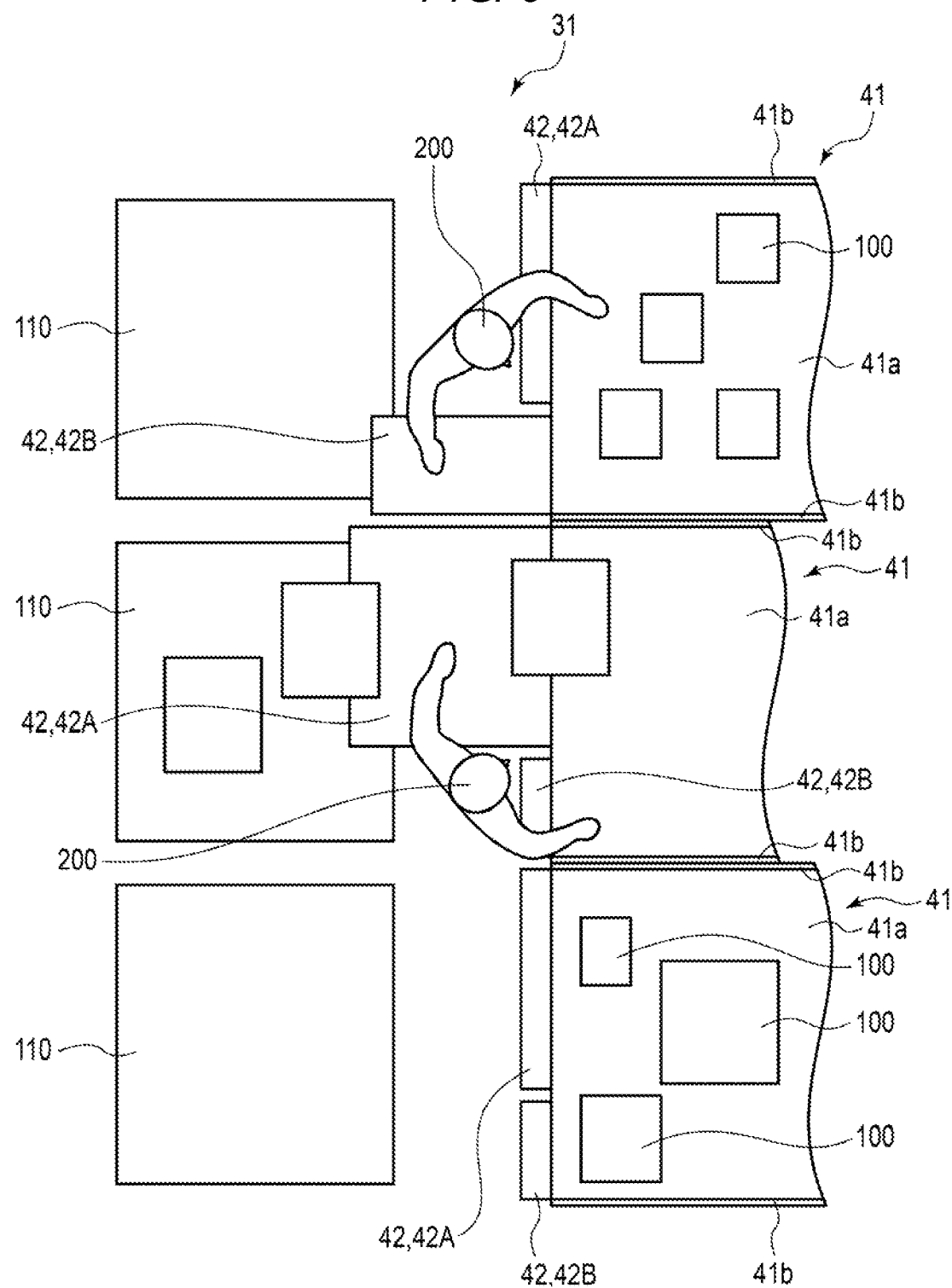
FIG. 9 is an explanatory view illustrating an example of merchandise sorting work using the merchandise sorting device according to an embodiment.

Referring to FIGS. 1 to 9, a merchandise sorting device 1 according to a first embodiment will be described. FIG. 1 is a plan view illustrating the configuration of the merchandise sorting device 1 according to the first embodiment. FIGS. 2 and 3 are side views schematically illustrating the configuration example and usage of a sorting chute 31 of the merchandise sorting device 1. FIGS. 4 to 7 are enlarged side, front, and plan views illustrating aspects of a chute body 41 and a sorting plate 42 in the sorting chute 31. FIG. 8 is a flowchart illustrating an example of merchandise sorting work, and FIG. 9 is an explanatory view illustrating a usage example of the sorting chute 31 during the merchandise sorting work.

The merchandise sorting device 1 includes a sort body 11, an induction 12, a chute group 13 (including a plurality of sorting chutes 31), and a control device 14. In the merchandise sorting device 1, items of merchandise (items) 100 (FIG. 2-FIG. 4) are fed into the sort body 11 at the induction 12, and the sort body 11 feeds the items 100 into the sorting chutes 31 divided according to the conveyance destination of the chute group 13, based on an address or sorting code provided on the item 100.

The item 100 is provided with a sorting code provided on a part of the outer surface thereof. At this time, at least an address or conveyance destination is assigned to the sorting code. For example, the sorting code may include a barcode printed on a paper sheet with an adhesive layer. The sorting code may be adhered on the item 100 and provided on the item 100.

The sort body 11 includes a conveyance path 21 formed in a ring shape, a driving source 22 (as shown in FIG. 2 and FIG. 3) for moving the conveyance path, a measurement module 23 for measuring the dimensions of the item 100, and a reader module 24 for reading an address or sorting code. The conveyance path 21 defines the conveying direction of the item 100. The conveyance path 21 is appropriately set based on the shape of the merchandise sorting device 1.

The conveyance path 21 includes a plurality of cells 21a connected in a ring shape for loading merchandise items. The conveyance path 21 is disposed at a predetermined height position with respect to the installation surface of the merchandise sorting device 1. Each of the cells 21a is a sorter which can move item 100 placed on the upper surface thereof to a predetermined sorting chute 31. A cell 21a includes a belt which is driven in a direction crossing the moving direction of the conveyance path 21. The driving source 22 moves the conveyance path 21 in one direction.

The measurement module 23 is disposed between the induction 12 and the chute group 13 on the conveyance path 21. The measurement module 23 measures the dimensions of the item 100 on a cell 21a. The measurement module 23 transmits information on the measured dimensions of the item 100 to the control device 14. The measurement module 23 may be provided in the induction 12 (not shown).

The reader module 24 reads an address or a sorting code provided on each item 100. The reader module 24 transmits the information read from the address or sorting code to the control device 14. The reader module 24 is a barcode reader. The reader module 24 may be provided in the induction 12 (not shown).

The induction 12 is a conveyer. The induction 12 places each item 100 fed by an operator onto a cell 21a of the conveyance path 21. The item 100 is placed on a single cell 21a or a plurality of cells 21a adjacent to each other, depending on the size thereof.

The chute group 13 includes a plurality of sorting chutes 31. The plurality of sorting chutes 31 are successively provided along the conveyance path 21. For example, as illustrated in FIG. 1, the sorting chutes 31 of the chute group 13 are provided at predetermined positions of the conveyance path 21 in a direction crossing the extension direction of the conveyance path 21 such that the conveyance path 21 is interposed between the sorting chutes 31.

As illustrated in FIGS. 2 to 7, the sorting chute 31 includes a chute body 41 and a sorting plate 42. The sorting chute 31 includes a storage container 110 provided at the lower end thereof, the storage container 110 including a container or mail box into which the item 100 is put.

The chute body 41 includes a bottom wall 41a constituting an inclined surface and extending in one direction and a pair of side walls 41b provided at two sides facing each other along the longitudinal direction of the bottom wall 41a. For example, the chute body 41 is a direct feed-type chute which can directly accommodate the item 100 into the storage container 110.

The inclined upper surface of the bottom wall 41a constitutes a conveyance path on which the item 100 is moved. The inclination angle of the bottom wall 41a is set to a predetermined inclination angle. The predetermined inclination angle indicates an angle at which the item 100 can slide on the upper surface of the bottom wall 41a due to its weight.

The sorting plate 42 closes a lower end opening of the chute body 41 and rotates in the moving direction of the item 100 of the chute body 41 about the lower end of the chute body 41, thereby opening the lower end opening of the chute body 41. The lower end opening of the chute body 41 is an end portion located at the bottom of the chute body 41, and an opening formed by the bottom wall 41a and the side walls 41b.

Figure 4:
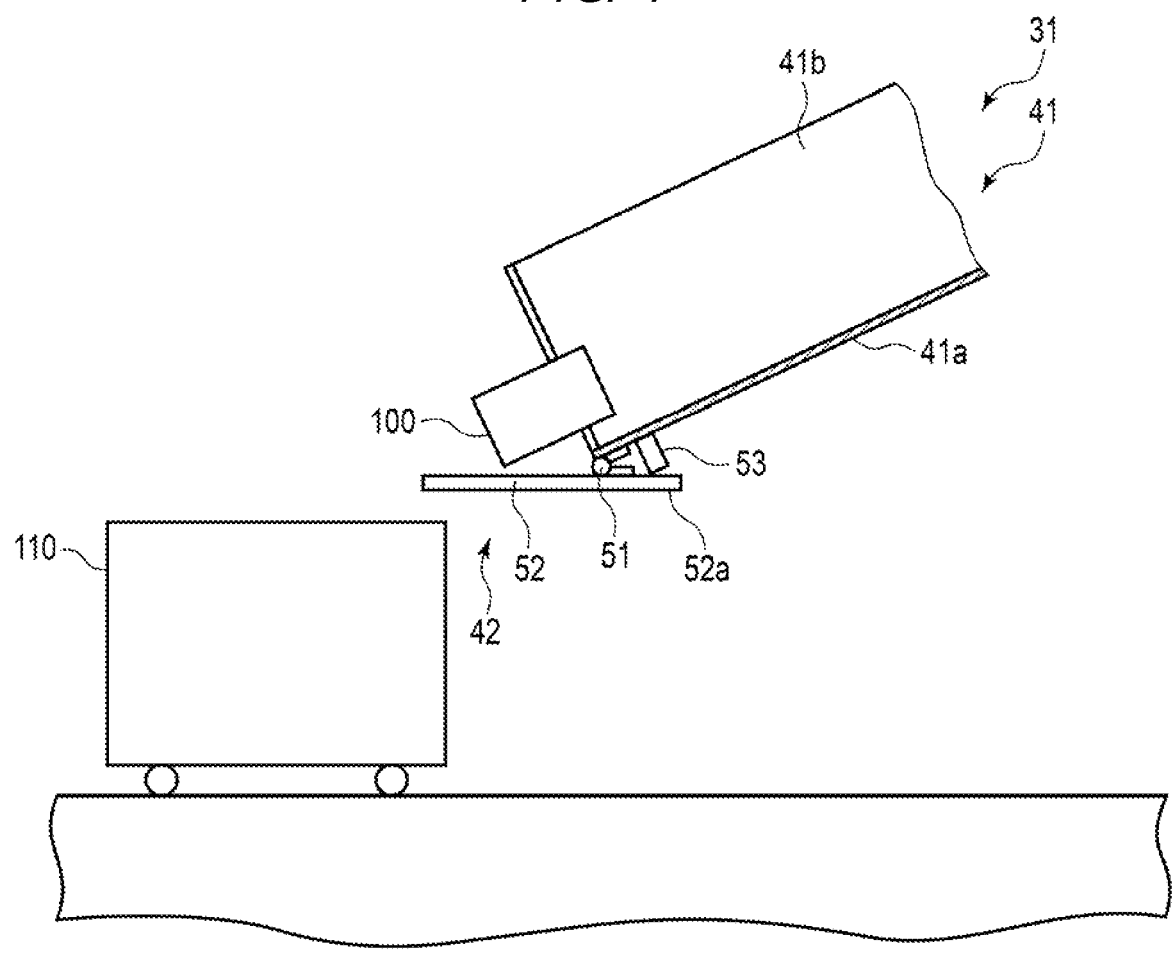
FIG. 4 is a side view illustrating a partial cross-section of the configuration of the sorting chute according to an embodiment.
Figure 5:
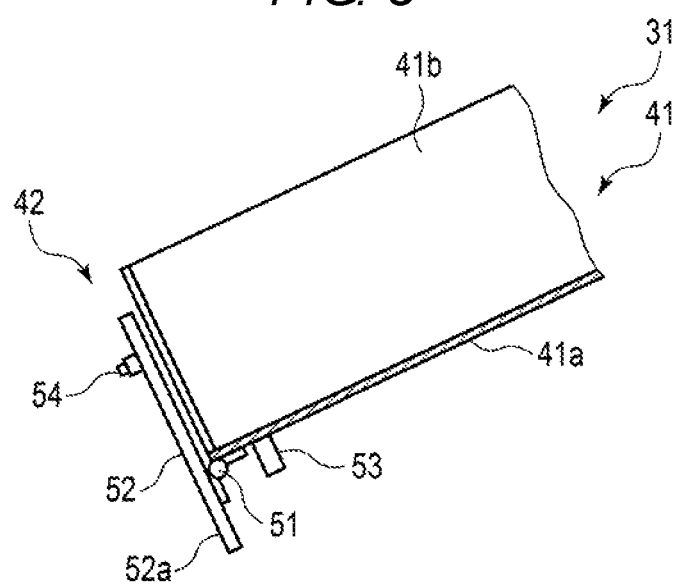
FIG. 5 is a side view illustrating a partial cross-section of the configuration of the sorting chute according to an embodiment.

As seen in FIG. 4 and FIG. 5, the sorting plate 42 includes a rotating shaft 51, a plate member 52, a stopper 53 and a lock member 54.

The rotating shaft 51 is provided on the lower surface of the lower end of the bottom wall 41a of the chute body 41. For example, the rotating shaft 51 is a hinge fixed to the bottom wall 31a and the plate member 52. The axial direction of the rotating shaft 51 is fixed to the bottom wall 41a along the edge of the lower end of the bottom wall 41a.

The plate member 52 is supported by the rotating shaft 51. The plate member 52 is formed in a rectangular plate shape. The plate member 52 is rotated about the rotating shaft 51. The plate member 52 is rotated about the rotating shaft 51 between the posture in which the plate member 52 closes the opening of the lower end of the chute body 41 and the posture in which the plate member 52 opens the opening of the lower end of the chute body 41. When the plate member 52 is referred to as closing the opening of the lower end of the chute body 41, it may indicate that the movement of the item 100 sliding on the bottom wall 31a of the chute body 41 is restricted by the plate member 52, such that the item 100 does not drop from the bottom wall 41a.

The length of the plate member 52 is set to such an extent that one side thereof with respect to the rotating shaft 51 closes the opening of the lower end of the chute body 41 in a direction crossing the rotating shaft 51. Furthermore, the other side of the plate member 52 with respect to the rotating shaft 51 is extended downward from the lower end of the chute body 41, when the plate member 52 closes the opening of the lower end of the chute body 41. That is, the plate member 52 includes an end portion 52a formed at the other side thereof in the direction crossing the rotating shaft 51, the end portion 51a coming into contact with the stopper 53.

The stopper 53 is provided on the lower surface on the lower end side of the bottom wall 41a. The end portion 52a of the plate member 52 is brought into contact with the stopper 53, and thus restricts the rotation of the plate member 52. When the plate member 52 is rotated in a direction to open the opening and the end portion 52a of the plate member 52 is brought into contact with the stopper 53, the stopper 53 supports the plate member 52, such that the plate member 52 takes a posture between the posture in which the plate member 52 is horizontally placed and the posture in which the plate member 52 is placed along the inclined surface. This is in order to cause the upper surface of the plate member 52 to function as the conveyance path of the item 100, when the plate member 52 opens the opening.

Preferably, the stopper 53 is made of an elastic material. More preferably, the stopper 53 is detachably provided on the lower surface of the bottom wall 41a, such that the rotation angle of the plate member 52 can be adjusted, the height of the stopper 53 from the lower surface of the bottom wall 41a can be varied, or the stopper 53 can replaced with another stopper having a different height. Moreover, a plurality of stoppers 53 may be provided on the lower surface of the bottom wall 41a, regardless of the number of sorting plates 42.

The lock member 54 can fix the plate member 52, when the plate member 52 closes the opening of the lower end of the chute body 41.

A plurality of such sorting plates 42 may be provided at the opening of the lower end of the chute body 41 in a widthwise direction of the chute body 41. The widthwise direction of the chute body 41 indicates a direction crossing the extension direction of the chute body 41, or specifically a direction in which the pair of side walls 41b of the chute body 41 face each other. For example, the plurality of sorting plates 42 have different widths in the widthwise direction of the lower end of the chute body 41. In the present embodiment, the plurality of sorting plates 42 may include two plates, that is, a first sorting plate 42A and a second sorting plate 42B having a smaller width than the first sorting plate 42A as shown in FIG. 6 and FIG. 7. The first and second sorting plates 42A and 42B include lock members 54 for fixing the first and second sorting plates 42A and 42B to the adjacent side walls 41b, respectively. In addition, the first and second sorting plates 42A and 42B include a common lock member 54 for fixing to each other.

The opening width of the lower end of the chute body 41 is changed by opening one or both of the first and second sorting plates 42A and 42B, based on the size of the item 100.

The control device 14 includes a communication interface 61, a memory unit 62 and a control unit 63. The communication interface 61 and the memory unit 62 are connected to the control unit 63 through a bus line or the like. The communication interface 61 is electrically connected to the cells 21a, the measurement module 23 and the reader module 24.

The memory unit 62 stores a plan for assigning the plurality of sorting chutes 31 to which items 100 are to be sorted, based on the conveyance destinations and/or weights of the items 100. The control unit 63 determines a sorting chute 31 into which the item 100 is to be fed, based on the sorting code of the item 100, read by the reader module 24. When the item 100 reaches the sorting chute 31 into which the item 100 is to be fed through the conveyance path 21, the control unit 63 drives the cell 21a to feed the item 100 to the sorting chute 31.

The merchandise sorting work by an operator using the merchandise sorting device 1 will be described with reference to the flowchart of FIG. 8.

First, an operator inputs a sorting condition for sorting items 100 to the sorting chutes 31, based on the conveyance destinations of the items 100, or selects a plan stored in the memory unit 62, and performs sorting setting operation (step ST1).

The operator selects whether to directly feed the item 100 into the storage container 110 through the chute body 41 or to manually feed the item 100 into the storage container 110, for each of the sorting chutes 31 (step ST2). The setting is manually inputted or is automatically performed based on a plan stored in the memory unit 62.

For example, in the case of the sorting chute 31 through which the item 100 is directly fed into the storage container 110 (YES at step ST2), the operator opens all of the sorting plates 42. That is, the operator releases the fixation of the plate member 52 by the lock member 54, and rotates the plate member 52 to open the first and second sorting plates 42A and 42B as illustrated in FIG. 4 (step ST3). In this state, the control unit 63 sorts the items 100 (step ST4). Specifically, the control unit 63 selects a sorting chute 31 into which item 100 is to be fed, according to the conveyance destination and/or weight of the item 100, read by the reader module 24. Then, the control unit 63 controls the driving source 22 so that the item 100 read by the reader module 24 is conveyed to the selected sorting chute 31 through the conveyance path 21, and drives the belt of the cell 21a, on which the item 100 is placed, so that the merchandise 100 is fed into the chute body 41.

Therefore, the item 100 slides on the bottom wall 41a of the chute body 41, passes the upper surfaces of the plate members 52 of the first and second sorting plates 42A and 42B from the lower opening of the chute body 41, and is directly accommodated in the storage container 110 (step ST5).

In the case of the sorting chute 31 from which the item 100 is manually accommodated into the storage container 110 (NO at step ST2), the operator closes the plate members 52 of the two sorting plates 42A and 42B, and fixes the sorting plates 42A and 42B to the chute body 41 through the lock member 54 (step ST6). As such, the operator closes the opening of the lower end of the chute body 41.

In this state, the control unit 63 sorts the items 100 in the same manner as step ST4 (step ST7). Therefore, while the movement of the sorted items 100 is restricted by the lower end of the chute body 41, the items 100 are accumulated at the lower end of the chute body 41 (step ST8).

Then, the operator determines whether the sizes of the accumulated items 100 are larger than the width of the second sorting plate 42B, or determines the sizes of the shapes of the items 100 (step ST9). That is, the operator determines whether the sizes of the accumulated items 100 correspond to a size at which the first sorting plate 42A is opened to pass the items 100 or a size at which the second sorting plate 42B is opened to pass the items 100.

When the shape of the item 100 has a large size or corresponds to the size at which the first sorting plate 42A can pass the item 100 (YES at step ST9), the operator opens the first sorting plate 42A (step ST10), as illustrated in the center of FIG. 9. The operator stands at an operating position corresponding to the position between the second sorting plate 42B and the storage container 110, and slides the item 100 on the plate member 52 of the opened first sorting plate 42a, such that the item 100 is accommodated into the storage container 110 (step ST11).

Similarly, when the item 100 corresponds to the size at which the second sorting plate 42B is opened to pass the item 100, the operator opens the second sorting plate 42B (step ST12), as illustrated at the top of FIG. 9. The operator stands at an operation position corresponding to the position between the first sorting plate 42A and the storage container 110, and slides the item 100 on the plate member 52 of the opened second sorting plate 42B, such that the item 100 is accommodated into the storage container 110 (step ST11), (FIG. 9).

Through such a process, the items 100 sorted by the merchandise sorting device 1 are directly or manually accommodated in the storage container 110.

According to the merchandise sorting device 1 having the above-described configuration, the sorting plate 42 of the sorting chute 31 is set to a structure in which the plate member 52 is rotated around an axis perpendicular to the gravity direction from the front of the chute body 41, that is, the structure in which the plate member 52 facing the opening of the lower end of the chute body 41 is reclined toward the storage container 110. Therefore, while the sorting plate 42 is opened, the plate member 52 functions as a guide constituting the conveyance path on which the item 100 slides. Thus, when accommodating the item 100 into the storage container 110, the operator does not need to lift the items 100, but may slide the item 100 on the upper surface of the plate member 52, and the sorting chute 31 using the sorting plate 42 improves sorting work efficiency. Furthermore, since the rotation angle of the plate member 52 is restricted by the stopper 53, an excessive load can be prevented from being applied to the rotating shaft for supporting the plate member 52 when the item 100 is slid.

The sorting chute 31 includes the plurality of sorting plates 42 installed in one chute body 41, such that the sorting plates 42 can be individually opened/closed. Furthermore, since the plurality of sorting plates 42 have different widths, a necessary sorting plate 42 may be selected and opened, depending on the shape of the item 100 passed through the sorting plate 42.

The sorting chute 31 can secure a work space of the operator between the closed sorting plate 42 and the storage container 110, as the operator is indicated by reference numeral 200 in FIG. 9. Since the sorting chute 31 can secure the work space of the operator, the sorting chute 31 has high work efficiency.

That is, since the plurality of sorting chutes 31 are arranged with no space in between as illustrated in FIG. 9, it is difficult to secure the work space of the operator. However, the sorting chute 31 according to the present embodiment can open some of the plurality of sorting plates 42, in order to secure the work space at the front of the closed sorting plate 42. Thus, high worker efficiency can be secured.

Since the plurality of sorting plates 42 have different widths, a necessary sorting plate 42 may be selected and opened, depending on the dimension and shape of the item 100 passed through the sorting plate 42. In particular, the width of the chute body 41 is set to a large value, such that the sorting chute 31 can sort items 100 having various dimensions and shapes. The standard width of the chute body 41 is set in the range of 1 m to 1.5 m, for example. Thus, in the related art, two operators stand at one chute body 41 and perform sorting work, because the hand of each operator cannot reach the left or right end of the chute body 41 in the widthwise direction. In the present embodiment, however, a necessary sorting plate 42 can be selected to set the work range of the operator to the minimum range, which makes it possible to reduce the work range of the operator.

When the item 100 is directly fed into the storage container 110, or is a large-sized merchandise item which cannot pass through the first sorting plate 42A, all of the sorting plates 42 can be opened to pass the item 100.

The chute body 41 of the sorting chute 31 is set to a direct feed-type, and the sorting plate 42 capable of opening/closing the opening of the lower end of the chute body 41 is provided at the lower end of the chute body 41. Therefore, as described above, the method of directly feeding the items 100 to the storage container 110 or the method of accumulating the items 100 at the lower end of the chute body 41 can be selected.

That is, when the items of merchandise are directly accommodated into the storage container 110, for example, when large-size items 100 and small-size items 100 are mixed or heavy items 100 are accommodated, any item 100 accommodated in the storage container 110 beforehand may be damaged. According to the merchandise sorting device 1, however, the operator can select the process of manually accommodating the items 100 into the storage container 110, when an item 100 accommodated in the storage container 100 in advance is likely to be damaged if another item 100 is to be placed into the storage container 110.

In the above-described merchandise sorting device 1 according to the present embodiment, the chute body 41 is provided with the plurality of sorting plates 42 having different widths and including the plate members 52 which can be rotated around the rotating shaft 51 at the lower end of the chute body 41 to function as a guide when the items 100 are conveyed. According to this structure, the merchandise sorting device 1 can reduce the work range of the operator while securing the work space of the operator, and allows selection as to whether to directly or manually accommodate the items 100 into the storage container 110, which makes it possible to improve the efficiency of the sorting work.

The present disclosure is not limited to the above-described embodiment, but the components can be modified and embodied at the implementation stage, without departing from the scope of the present disclosure.

Figure 10:
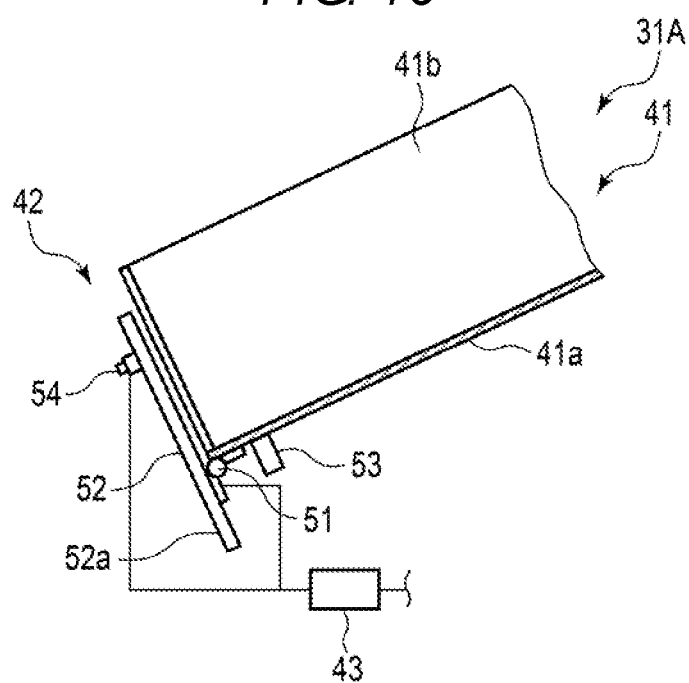
FIG. 10 is a side view illustrating a configuration of a sorting chute according to an embodiment.

In the above-described example, the operator fixes and releases the plate member 52 using the lock member 54, and rotates the plate member 52. However, the present embodiment is not limited thereto. As a specific example, a merchandise sorting device 1 which automatically opens/closes the plate member 52 using a sorting chute 31A according to a second embodiment will be described with reference to FIG. 10. In the merchandise sorting device 1 using the sorting chute 31A according to the second embodiment, the same components as those of the merchandise sorting device 1 according to the first embodiment will be represented by the same reference numerals, and the detailed descriptions are omitted herein.

For example, the sorting chute 31A further includes a driving device 43 which controls the lock member 54, fixes and releases the plate member 52 through the lock member 54, and rotates the plate member 52, in addition to the chute body 41 and the plurality of sorting plates 42. The driving device 43 is electrically connected to the control unit 63.

The control unit 63 is electrically connected to the driving device 43. The control unit 63 selects a sorting chute 31A from a plan stored in the memory unit 62 and the sorting code of item 100, read through the reader module 24, and selects a sorting plate 42 of the sorting chute 31A, based on the dimension and shape of the item 100 measured by the measurement module 23. The control unit 63 opens the selected sorting plate 42. As such, the sorting chute 31A may include the driving device 43 for opening/closing the sorting plate 42, and the control unit 63 may control the driving device 43 to selectively open/close the sorting plate 42 based on the item 100.

The merchandise sorting device 1 may determine whether the sorting chute 31 is full, based on the total weight of items 100 sorted to the sorting chute 31, in addition to the conveyance destinations of the items 100. Specifically, the weight information of the items 100 is recorded in the sorting codes of the items 100, and the control unit 63 adds up the weights of the items 100, read by the reader module 24, for each sorting chute 31, and stores the addition result in the memory unit 62, during the full condition determination process. Then, the control unit 63 compares a threshold value corresponding to the total weight assigned to one sorting chute 31 to the added total weight of the items 100 sorted to the sorting chute 31, the threshold value being stored in the memory unit 62 in advance. When the total weight exceeds the threshold value, the control unit 63 determines that the sorting chute 31 is full.

Then, the control unit 63 does not feed items 100 to the sorting chute 31. Furthermore, the control unit 63 controls a notification unit, such as a lamp, for each of the sorting chutes 31, and informs the operator that the sorting chute 31 is full. As such, the control unit 63 of the merchandise sorting device 1 may perform the full condition determination operation.

In the above-described example, the sorting chute 31 includes two sorting plates 42 installed in the chute body 41. However, the present embodiment is not limited thereto, and the sorting chute 31 may include three or more sorting plates 42.

Figure 11:
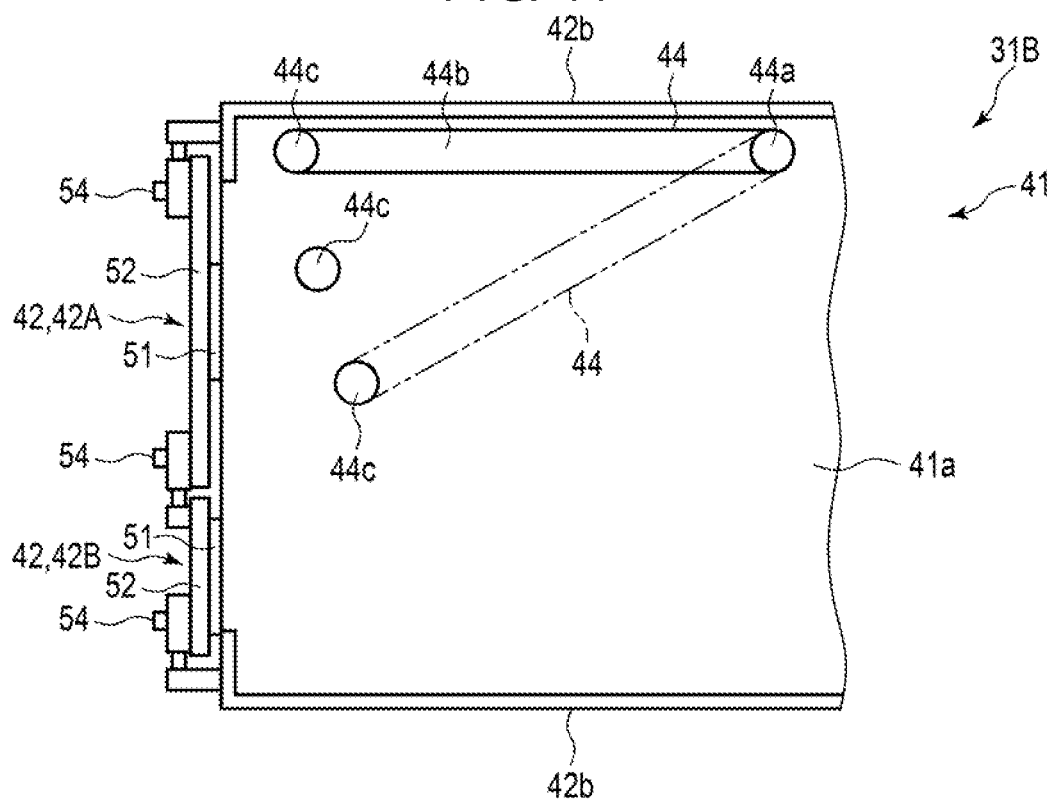
FIG. 11 is a plan view illustrating a configuration of a sorting chute according to an embodiment.

As illustrated in FIG. 11 illustrating a sorting chute 31B according to a third embodiment, a guide member 44 for guiding the item 100 toward anyone of the plurality of sorting plates 42 may be provided on the bottom wall 41a of the chute body 41. For example, the guide member 44 includes a rotating shaft 44a, a guide unit 44b which can be rotated about the rotating shaft 44a, and a fixing member 44c for fixing the guide unit 44b to the bottom wall 41a at a predetermined angle. As illustrated in FIG. 11, one guide member 44 may be provided to guide the item 100 toward the second sorting plate 42B, or two guide members 44 may be provided to guide towards the first and second sorting plates 42A and 42B, respectively. The guide unit 44b may be formed in a plate shape or rod shape.

When the second sorting plate 42B is opened to move the item 100 to the storage container 110 from the opening of the lower end of the chute body 41 including the second sorting plate 42B, the guide member 44 rotates the guide unit 44b and fixes the guide unit 44b to the bottom wall 41a through the fixing member 44c, as indicated by alternate long and two short dashes lines in FIG. 11. Therefore, since the opening width at the lower end of the chute body 41 is gradually decreased toward the second sorting plate 42B, the item 100 fed into the chute body 41 is guided by the guide member 44, and moved to the opening. Furthermore, when the two sorting plates 42A and 42B are opened, the guide unit 44b can be fixed to the side wall 42b as indicated by solid lines of FIG. 11, and thus prevented from guiding the movement of the items 100.

The above-described guide member 44 may be detachably provided only on certain ones of the sorting chutes 31 as necessary.

The merchandise sorting device 1 according to at least one of the above-described embodiments can reduce the work range of motion for an operator while still securing the work space of the operator, and allows selection as to whether to directly or manually accommodate the items 100 into the storage container 110, which makes it possible to improve the efficiency of the sorting work.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A merchandise sorting device, comprising:
   a conveyance path including a placement surface on which an item is placed;
   a chute inclined downward from the conveyance path, the chute including a bottom wall forming an inclined surface on which the item is slid; and
   a sorting plate at a lower end of the chute and rotatable about an axis along an edge at a lower end of the bottom wall to open and close the lower end of the chute, wherein the sorting plate comprises:
   a rotating shaft provided at the lower end of the bottom wall;
   a plate member configured to rotate about the rotating shaft and having a first side that blocks the lower end of the chute in a direction crossing the rotating shaft and a second side that extends downward from the lower end of the bottom wall in a direction crossing the rotating shaft when the plate member blocks the lower end of the chute;
   a stopper on a lower surface of the bottom wall at the lower end and positioned to contact an end portion on the second side of the plate member when the plate member opens the lower end of the chute; and
   a lock member configured to fix the plate member in position when the plate member blocks the lower end of the chute.

2. The merchandise sorting device according to claim 1, wherein a plurality of sorting plates is at the lower end of the chute, a plurality of chutes being adjacent to one another along a width direction of the chute.

3. The merchandise sorting device according to claim 2, wherein the plurality of sorting plates have different widths.

4. The merchandise sorting device according to claim 2, further comprising:
   a guide member in the chute configured to guide the merchandise toward a sorting plate.

5. The merchandise sorting device according to claim 1, wherein the sorting plate is positioned between a horizontal wall and the bottom wall when the lower end of the chute is opened.

6. The merchandise sorting device according to claim 1, further comprising:
   a control unit that records a weight of items sorted to the chute and that stores a weight total for all items in the chute, wherein
   the control unit compares the stored weight total to a threshold value and if the weight total exceeds the threshold value, the control unit blocks further additions of items to the chute.

7. The merchandise sorting device according to claim 6, wherein the control unit provides a notification when the control unit blocks the further additions of items to the chute.

8. The merchandise sorting device according to claim 1, further comprising a plurality of chutes arranged directly adjacent to one another, wherein
   a single sorting plate is provided at the lower ends of multiple chutes in the plurality.

9. The merchandise sorting device according to claim 8, wherein a chute body includes a plurality of sorting plates having different widths.

10. A sorting plate for a merchandise sorting device for sorting items of merchandise, the merchandise sorting device including a chute inclined downward from a conveyance path, the chute including a bottom wall having an inclined surface on which the items of merchandise are slid down from the conveyance path, the sorting plate comprising:
    a rotating shaft at a lower end of the bottom wall and extending along an edge of the lower end of the bottom wall; and
    a plate member attached to the rotating shaft and configured to open and close a lower end of the chute, wherein
    a first side of the plate member blocks the lower end of the chute in a direction crossing the rotating shaft,
    a second side of the plate member extends downward from the lower end of the bottom wall in the direction crossing the rotating shaft when the plate member blocks the lower end of the chute, and
    the sorting plate further includes:
    a stopper on a lower surface of the bottom wall at the lower end and positioned to contact an end portion on the second side of the plate member in the direction crossing the rotating shaft when the plate member opens the lower end of the chute, and
    a lock member configured to fix the plate member in place when the plate member blocks the lower end of the chute.

11. The sorting plate according to claim 10, further comprising:
  a plurality of rotating shafts at the lower end of the bottom wall; and
  a plurality of plate members attached to the plurality of rotating shafts.

12. The sorting plate according to claim 11, wherein the plate members have different widths in an axial direction of the plurality of rotating shafts.

13. A merchandise sorting device, comprising:
  a conveyance path including a placement surface on which an item is placed;
  a chute inclined downward from the conveyance path, the chute including a bottom wall forming an inclined surface on which the item is slid;
  a sorting plate at a lower end of the chute and rotatable about an axis along an edge at a lower end of the bottom wall to open and close the lower end of the chute; and
  a control unit that records a weight of items sorted to the chute and that stores a weight total for all items in the chute, wherein
  the control unit compares the stored weight total to a threshold value and if the weight total exceeds the threshold value, the control unit blocks further additions of items to the chute.

14. The merchandise sorting device according to claim 13, wherein the control unit provides a notification when the control unit blocks the further additions of items to the chute.

15. The merchandise sorting device according to claim 13, further comprising a plurality of chutes arranged directly adjacent to one another, wherein
  a single sorting plate is provided at the lower ends of multiple chutes in the plurality.

16. The merchandise sorting device according to claim 15, wherein a chute body includes a plurality of sorting plates having different widths.

17. The merchandise sorting device according to claim 13, wherein a plurality of sorting plates is at the lower end of the chute, a plurality of chutes being adjacent to one another along a width direction of the chute.

18. The merchandise sorting device according to claim 17, wherein the plurality of sorting plates have different widths.

19. The merchandise sorting device according to claim 17, further comprising:
  a guide member in the chute configured to guide the merchandise toward a sorting plate.

20. The merchandise sorting device according to claim 13, wherein the sorting plate is positioned between a horizontal wall and the bottom wall when the lower end of the chute is opened.

* * * * *